(12) United States Patent
Meredith et al.

(10) Patent No.: US 11,124,407 B2
(45) Date of Patent: Sep. 21, 2021

(54) MOBILE DISTRIBUTION STATION HAVING ONBOARD FLUID STORAGE TANK

(71) Applicant: Fuel Automation Station, LLC, Birmingham, MI (US)

(72) Inventors: Michael Meredith, New Baden, TX (US); Garrett Walther, Frederick, CO (US)

(73) Assignee: FUEL AUTOMATION STATION, LLC., Birmingham, MI (US)

( * ) Notice: Subject to any disclaimer, the term of this patent is extended or adjusted under 35 U.S.C. 154(b) by 109 days.

(21) Appl. No.: 16/111,615

(22) Filed: Aug. 24, 2018

(65) Prior Publication Data
US 2020/0062577 A1    Feb. 27, 2020

(51) Int. Cl.
| | |
|---|---|
| *B67D 7/08* | (2010.01) |
| *G05D 7/06* | (2006.01) |
| *B67D 7/36* | (2010.01) |
| *B67D 7/84* | (2010.01) |
| *B67D 7/62* | (2010.01) |
| *B67D 7/70* | (2010.01) |
| *B67D 7/78* | (2010.01) |
| *B67D 7/40* | (2010.01) |

(52) U.S. Cl.
CPC ............ *B67D 7/08* (2013.01); *B67D 7/36* (2013.01); *B67D 7/40* (2013.01); *B67D 7/62* (2013.01); *B67D 7/70* (2013.01); *B67D 7/78* (2013.01); *B67D 7/845* (2013.01); *G05D 7/0652* (2013.01)

(58) Field of Classification Search
None
See application file for complete search history.

(56) References Cited

U.S. PATENT DOCUMENTS

| | | | | |
|---|---|---|---|---|
| 9,586,805 | B1 * | 3/2017 | Shock | B67D 7/845 |
| 10,150,662 | B1 * | 12/2018 | Shock | B67D 7/74 |
| 10,494,251 | B2 * | 12/2019 | Shock | B67D 7/04 |
| 10,513,426 | B2 * | 12/2019 | Shock | B67D 7/3272 |
| 2004/0007286 | A1 * | 1/2004 | Kamikozuru | B60P 3/2245 |
| | | | | 141/231 |
| 2015/0123462 | A1 * | 5/2015 | Kamradt | B64C 39/024 |
| | | | | 307/9.1 |
| 2017/0313570 | A1 * | 11/2017 | Kittoe | B67D 7/3209 |
| 2018/0099862 | A1 * | 4/2018 | Shock | B67D 7/465 |
| 2018/0101183 | A1 * | 4/2018 | Shock | G05D 9/12 |
| 2019/0031497 | A1 * | 1/2019 | Frizzie | B67D 7/40 |
| 2020/0102208 | A1 * | 4/2020 | Shock | B67D 7/78 |
| 2020/0109043 | A1 * | 4/2020 | Shock | B67D 7/36 |

FOREIGN PATENT DOCUMENTS

CA        2693567 A1 * 10/2010 ............... B67D 7/04

* cited by examiner

*Primary Examiner* — Daphne M Barry
(74) *Attorney, Agent, or Firm* — Carlson, Gaskey & Olds, P.C.

(57) ABSTRACT

A distribution station includes a mobile trailer, a pump on the mobile trailer, at least one manifold on the mobile trailer and fluidly connected with the pump, a plurality of reels on the mobile trailer, and at least one fluid storage tank extending under the reels. A plurality of hoses are connected with a different one of the reels. A plurality of valves on the mobile trailer are situated between the at least one manifold and a respective different one of the reels. A plurality of fluid level sensors are associated with a different one of the hoses, and a controller is configured to individually open and close the valves responsive to the fluid level sensors.

22 Claims, 4 Drawing Sheets

MOBILE DISTRIBUTION STATION HAVING ONBOARD FLUID STORAGE TANK

BACKGROUND

Hydraulic fracturing (also known as fracking) is a well-stimulation process that utilizes pressurized liquids to fracture rock formations. Pumps and other equipment used for hydraulic fracturing typically operate at the surface of the well site. The equipment may operate until refueling is needed, at which time the equipment may be shut-down for refueling. Shut-downs are costly and reduce efficiency. More preferably, to avoid shut-downs fuel is replenished in a hot-refueling operation while the equipment continues to run. This permits fracking operations to proceed continuously. However, hot-refueling can be difficult to reliably sustain for the duration of the fracking operation.

SUMMARY

A distribution station according to an example of the present disclosure includes a mobile trailer, a pump on the mobile trailer, at least one manifold on the mobile trailer and fluidly connected with the pump, a plurality of reels on the mobile trailer, and at least one fluid storage tank extending under the reels. A plurality of hoses are connected with a different one of the reels. A plurality of valves on the mobile trailer are situated between the at least one manifold and a respective different one of the reels. A plurality of fluid level sensors are associated with a different one of the hoses, and a controller is configured to individually open and close the valves responsive to the fluid level sensors.

In a further embodiment of any of the foregoing embodiments, the at least one fluid storage tank is L-shaped.

In a further embodiment of any of the foregoing embodiments, the at least one fluid storage tank has an aspect ratio of width to height that is greater than 1.

In a further embodiment of any of the foregoing embodiments, the at least one fluid storage tank has an aspect ratio of width to height that is greater than 1.5.

In a further embodiment of any of the foregoing embodiments, the at least one fluid storage tank is formed of stainless steel.

In a further embodiment of any of the foregoing embodiments, the at least one fluid storage tank is connected with the pump and at least one of the reels and one of the hoses.

In a further embodiment of any of the foregoing embodiments, the at least one fluid storage tank includes first and second fluid storage tanks that are arranged on, respectively, first and second opposed sides of the mobile trailer, with an aisle walkway down the middle of the mobile trailer between the first and second fluid storage tanks.

In a further embodiment of any of the foregoing embodiments, the at least one fluid storage tank is polygonal in shape.

A further embodiment of any of the foregoing embodiments includes diesel fuel contained in the at least one fluid storage tank.

A distribution station according to an example of the present disclosure includes a mobile trailer, a pump on the mobile trailer, at least one manifold on the mobile trailer and fluidly connected with the pump, a plurality of reels on the mobile trailer, a rack supporting the reels, and a fluid storage tank extending under the rack. Hoses are connected with different ones of the reels. Valves on the mobile trailer are situated between the manifold and respective different ones of the reels. A plurality of fluid level sensors are associated with a different one of the hoses, and a controller is configured to individually open and close the valves responsive to the fluid level sensors.

In a further embodiment of any of the foregoing embodiments, the at least one fluid storage tank is L-shaped.

In a further embodiment of any of the foregoing embodiments, the at least one fluid storage tank has an aspect ratio of width to height that is greater than 1.

In a further embodiment of any of the foregoing embodiments, the at least one fluid storage tank includes first and second fluid storage tanks that are arranged on, respectively, first and second opposed sides of the mobile trailer, with an aisle walkway down the middle of the mobile trailer between the first and second fluid storage tanks.

In a further embodiment of any of the foregoing embodiments, the at least one fluid storage tank has an aspect ratio of width to height that is greater than 1.5.

In a further embodiment of any of the foregoing embodiments, the at least one fluid storage tank is formed of stainless steel.

In a further embodiment of any of the foregoing embodiments, the at least one fluid storage tank is connected with the pump and at least one of the reels and one of the hoses.

In a further embodiment of any of the foregoing embodiments, the at least one fluid storage tank is polygonal in shape.

A further embodiment of any of the foregoing embodiments includes diesel fuel contained in the at least one fluid storage tank.

A distribution station according to an example of the present disclosure includes a mobile trailer, a pump on the mobile trailer, at least one manifold on the mobile trailer and fluidly connected with the pump, a plurality of reels on the mobile trailer, and a low-profile fluid storage tank on the mobile trailer and fluidly connected with the pump. Hoses are connected with a different one of the reels. Valves on the mobile trailer are situated between the manifold and a respective different one of the reels. Fluid level sensors are associated with a different ones of the hoses, and a controller is configured to individually open and close the valves responsive to the fluid level sensors.

In a further embodiment of any of the foregoing embodiments, the low-profile fluid storage tank has an aspect ratio of width to height that is greater than 1.5.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
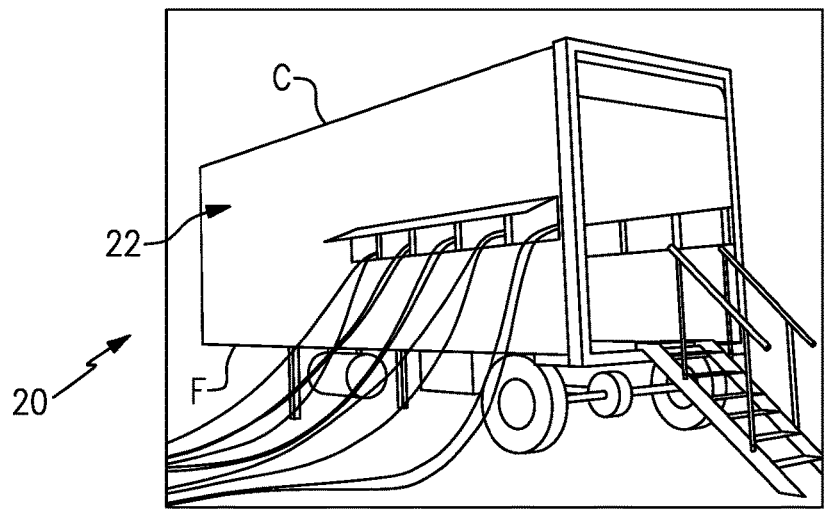
FIG. 1 illustrates an example mobile distribution station.
Figure 2:
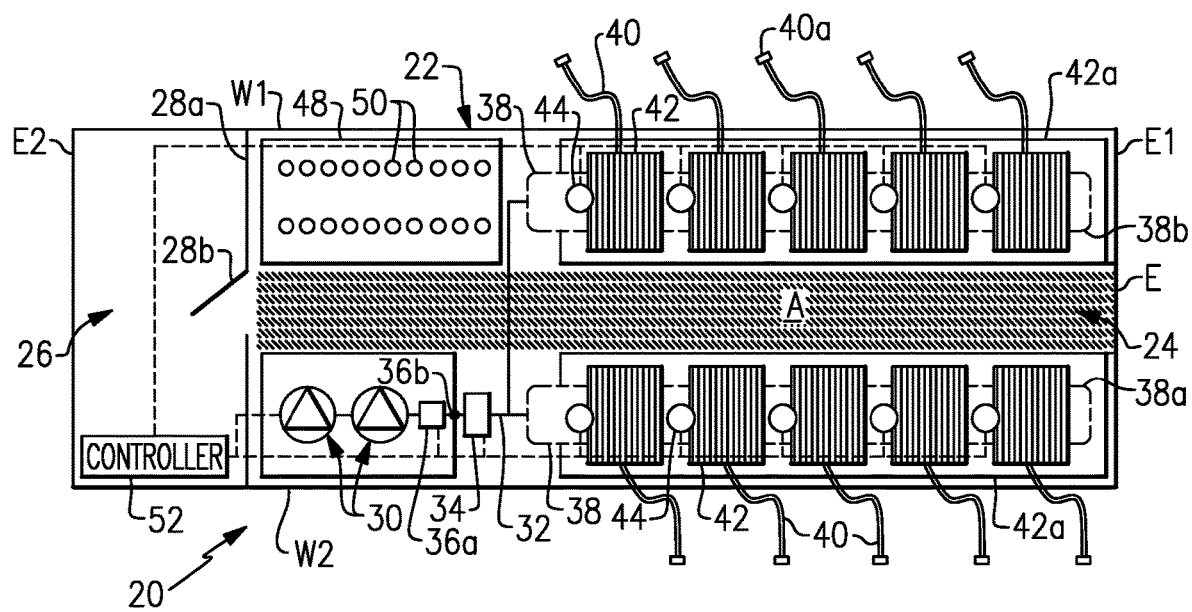
FIG. 2 illustrates an internal layout of a mobile distribution station.

FIG. 1 illustrates a mobile distribution station 20 and FIG. 2 illustrates an internal layout of the station 20. As will be described, the station 20 may serve in a "hot-refueling" capacity to distribute fuel to multiple pieces of equipment while the equipment is running, such as fracking equipment at a well site. As will be appreciated, the station 20 is not limited to applications for fracking or for delivering fuel. The examples herein may be presented with respect to fuel delivery, but the station 20 may be used in mobile delivery of other fluids, in other gas/petroleum recovery operations, or in other operations where mobile refueling or fluid delivery will be of benefit.

In this example, the station 20 includes a mobile trailer 22. Generally, the mobile trailer 22 is elongated and has first and second opposed trailer side walls W1 and W2 that join first and second opposed trailer end walls E1 and E2. To the extent that directionality is used herein, length, width, and height are orthogonal, where the length is in the elongated direction of the mobile trailer 22 between the end walls E1 and E2, width is in the direction between the side walls W1 and W2, and height is between the floor F and ceiling C (FIG. 1).

The mobile trailer 22 may have wheels that permit the mobile trailer 22 to be moved by a vehicle from site to site to service different hot-refueling operations. In this example, the mobile trailer 22 has two compartments. A first compartment 24 includes the physical components for distributing fuel, such as diesel fuel, and a second compartment 26 serves as an isolated control room for managing and monitoring fuel distribution. The compartments 24/26 are separated by an inside wall 28*a* that has an inside door 28*b*.

The first compartment 24 includes one or more pumps 30. Fuel may be provided to the one or more pumps 30 from an external fuel source, such as a tanker truck on the site. As will be described in more detail below, the mobile trailer 22 may also have an onboard, or internal, fuel supply. On the trailer 22, the one or more pumps 30 are fluidly connected via a fuel line 32 with one or more high precision registers 34 for metering fuel. The fuel line 32 may include, but is not limited to, hard piping. In this example, the fuel line 32 includes a filtration and air eliminator system 36*a* and one or more sensors 36*b*. Although optional, the system 36*a* is beneficial in many implementations, to remove foreign particles and air from the fuel prior to delivery to the equipment. The one or more sensors 36*b* may include a temperature sensor, a pressure sensor, or a combination thereof, which assist in fuel distribution management.

The fuel line 32 is connected with one or more manifolds 38. In the illustrated example, the station 20 includes two manifolds 38, represented at 38*a* and 38*b*, which are arranged on opposed sides of the compartment 24. As an example, the manifolds 38 are elongated tubes that are generally larger in diameter than the fuel line 32 and that have at least one inlet and multiple outlets. Each hose 40 is wound, at least initially, on a reel 42 that is rotatable to extend or retract the hose 40 externally through one or more windows of the trailer 22. Each reel 42 may have an associated motor to mechanically extend and retract the hose 40.

Figure 3:
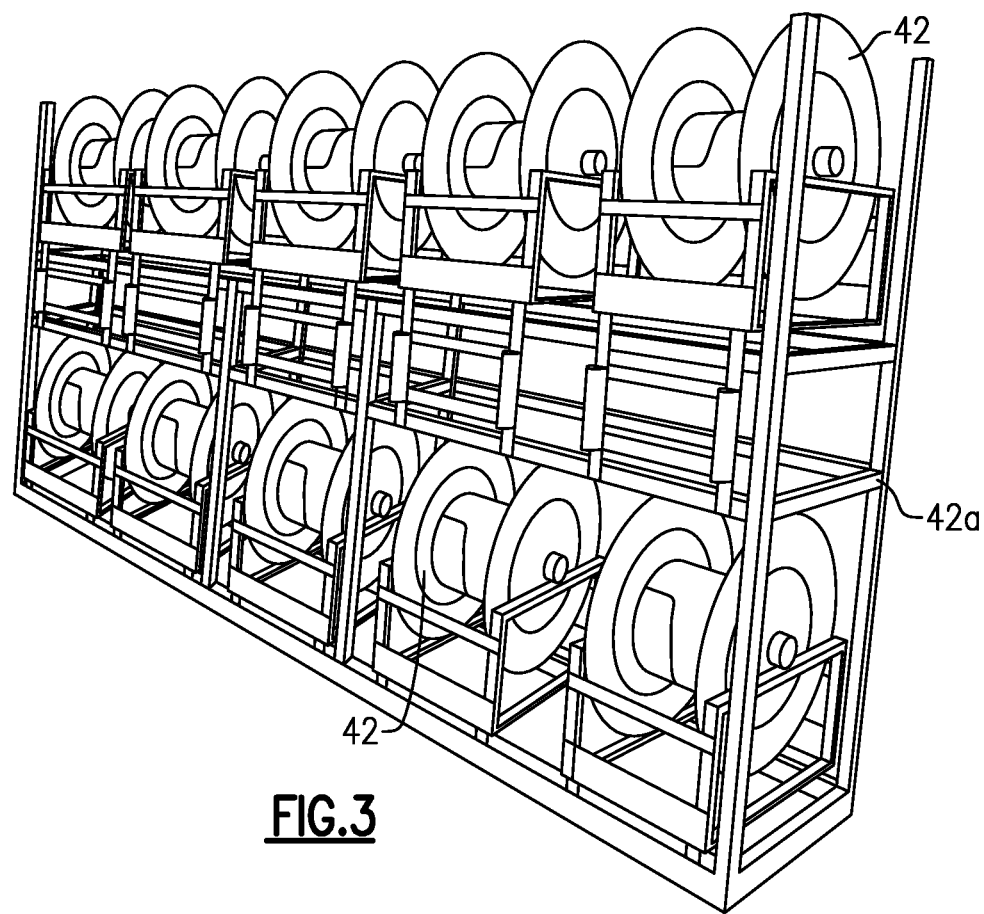
FIG. 3 illustrates an isolated view of hose reels on a support rack used in a mobile distribution station.

As shown in an isolated view in FIG. 3, the reels 42 may be mounted and supported on a support rack 42*a*. In this example, the support rack 42*a* is configured with upper and lower rows of reels 42. There may be two support racks 42*a* (FIG. 2) arranged on opposed sides of the first compartment 24, with an aisle (A) that runs between the support racks 42*a* from an outside door E to the inside door 28*b*. As will be appreciated, the number of reels and hoses in a particular implementation of the mobile trailer 22 may be varied.

Figure 4:
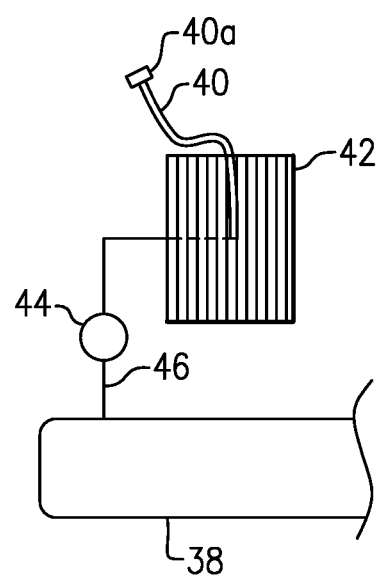
FIG. 4 illustrates an example of a connection between a manifold, a control valve, and a reel.

As shown in a representative example in FIG. 4, each hose 40 is connected to a respective one of the reels 42 and a respective one of a plurality of control valves 44. For example, a secondary fuel line 46 leads from the manifold 38 to the reel 42. The control valve 44 is in the secondary fuel line 46. The control valve 44 is moveable between open and closed positions to selectively permit fuel flow from the manifold 38 to the reel 42 and the hose 40. For example, the control valve 44 is a powered valve, such as a solenoid valve.

In the illustrated example, the first compartment 24 also includes a sensor support rack 48. The sensor support rack 48 holds integrated fuel cap sensors 50 (when not in use), or at least portions thereof. When in use, each integrated fuel cap sensor 50 is temporarily affixed to a piece of equipment (i.e., the fuel tank of the equipment) that is subject to the hot-refueling operation. Each hose 40 may include a connector end 40*a* and each integrated fuel cap sensor 50 may have a corresponding mating connector to facilitate rapid connection and disconnection of the hose 40 with the integrated fuel cap sensor 50. For example, the connector end 40*a* and mating connector on the integrated fuel cap sensor 50 form a hydraulic quick-connect.

At least the control valves 44, pump or pumps 30, sensor or sensors 36*b*, and register 34 are in communication with a controller 52 located in the second compartment 26. As an example, the controller 52 includes software, hardware, or both that is configured to carry out any of the functions described herein. In one further example, the controller 52 includes a programmable logic controller with a touchscreen for user input and display of status data. For example, the screen may simultaneously show multiple fluid levels of the equipment that is being serviced.

When in operation, the integrated fuel cap sensors 50 are mounted on respective fuel tanks of the pieces of equipment that are subject to the hot-refueling operation. The hoses 40 are connected to the respective integrated fuel cap sensors 50. Each integrated fuel cap sensor 50 generates signals that are indicative of the fuel level in the fuel tank of the piece of equipment on which the integrated fuel cap sensor 50 is mounted. The signals are communicated to the controller 52.

The controller 52 interprets the signals and determines the fuel level for each fuel tank of each piece of equipment. In response to a fuel level that falls below a lower threshold, the controller 52 opens the control valve 44 associated with the hose 40 to that fuel tank and activates the pump or pumps 30. The pump or pumps 30 provide fuel flow into the manifolds 38 and through the open control valve 44 and reel 42 such that fuel is provided through the respective hose 40 and integrated fuel cap sensor 50 into the fuel tank. The lower threshold may correspond to an empty fuel level of the fuel tank, but more typically the lower threshold will be a level above the empty level to reduce the potential that the equipment completely runs out of fuel and shuts down.

The controller 52 also determines when the fuel level in the fuel tank reaches an upper threshold. The upper threshold may correspond to a full fuel level of the fuel tank, but more typically the upper threshold will be a level below the full level to reduce the potential for overflow. In response to reaching the upper threshold, the controller 52 closes the respective control valve 44 and ceases the pump or pumps 30. If other control valves 44 are open or are to be opened, the pump or pumps 30 may remain on. The controller 52 can also be programmed with an electronic stop failsafe measure to prevent over-filling. As an example, once an upper threshold is reached on a first tank and the control valve 44 is closed, but the pump 30 is otherwise to remain on to fill other tanks, if the fuel level continues to rise in the first tank, the controller 52 shuts the pump 30 off.

Multiple control valves 44 may be open at one time, to provide fuel to multiple fuel tanks at one time. Alternatively, if there is demand for fuel from two or more fuel tanks, the controller 52 may sequentially open the control valves 44 such that the tanks are refueled sequentially. For instance, upon completion of refueling of one fuel tank, the controller 52 closes the control valve 44 of the hose 40 associated with that tank and then opens the next control valve 44 to begin refueling the next fuel tank. Sequential refueling may facilitate maintaining internal pressure in the manifold and fuel line 32 above a desired or preset pressure threshold to more rapidly deliver fuel. Similarly, the controller 52 may limit the number of control valves 44 that are open at any one instance in order to maintain the internal pressure in the manifold and fuel line 32 above a desired or preset threshold. The controller 52 may perform the functions above while in an automated operating mode. Additionally, the controller 52 may have a manual mode in which a user can control at least some functions through the PLC, such as starting and stopped the pump 30 and opening and closing control valves 44. For example, manual mode may be used at the beginning of a job when initially filling tanks to levels at which the fuel cap sensors 50 can detect fuel and/or during a job if a fuel cap sensor 50 becomes inoperable. Of course, operating in manual mode may deactivate some automated functions, such as filling at the low threshold or stopping at the high threshold.

In addition to the use of the sensor signals to determine fuel level, or even as an alternative to use of the sensor signals, the refueling may be time-based. For instance, the fuel consumption of a given piece of equipment may be known such that the fuel tank reaches the lower threshold at known time intervals. The controller 52 is operable to refuel the fuel tank at the time intervals rather than on the basis of the sensor signals, although sensor signals may also be used to verify fuel level.

The controller 52 also tracks the amount of fuel provided to the fuel tanks. For instance, the register 34 precisely measures the amount of fuel provided from the pump or pumps 30. As an example, the register 34 is an electronic register and has a resolution of about 0.1 gallons. The register 34 communicates measurement data to the controller 52. The controller 52 can thus determine the total amount of fuel used to very precise levels. The controller 52 may also be configured to provide outputs of the total amount of fuel consumed. For instance, a user may program the controller 52 to provide outputs at desired intervals, such as by worker shifts or daily, weekly, or monthly periods. The outputs may also be used to generate invoices for the amount of fuel used. As an example, the controller 52 may provide a daily output of fuel use and trigger the generation of an invoice that corresponds to the daily fuel use, thereby enabling almost instantaneous invoicing.

In a further example, the integrated fuel cap sensors 50 are each hard-wired to the controller 52. The term "hard-wired" or variations thereof refers to a wired connection between two components that serves for electronic communication there between, which here is a sensor and a controller. The hard-wiring may facilitate providing more reliable signals from the integrated fuel cap sensors 50. For instance, the many pieces of equipment, vehicles, workers, etc. at a site may communicate using wireless devices. The wireless signals may interfere with each other and, therefore, degrade communication reliability. Hard-wiring the integrated fuel cap sensors 50 to the controller 52 facilitates reduction in interference and thus enhances reliability.

As indicated above, the mobile trailer 22 may also include an onboard, or internal, fuel or fluid supply. In this regard, as shown in a rear view of the mobile trailer 22 in FIG. 5 and the sectioned view taken along a portion of the length of the mobile trailer 22 in FIG. 6, the mobile trailer 22 includes one or more fluid storage tanks 60. In the illustrated example, the mobile trailer 22 includes two tanks 60 (first and second tanks) on opposed sides of the aisle (A). The tank or tanks 60 are generally liquid-tight and may thus be used to hold and store a fluid, such as diesel fuel. As an example, the tank or tanks 60 are in fluid communication with one or more of the pumps 30 and one or more of the reels 42 and hoses 40 to store, and selectively deliver, clear diesel fuel to equipment at a site.

Space in the mobile trailer 22 is limited, and there is the challenge of incorporating such tanks without crowding other components or creating potential safety concerns for operators. In this regard, the tank or tanks 60 are non-obtrusively integrated into the spatial layout of the equipment in the mobile trailer 22 to reduce crowding and hazard concerns. More specifically, the tank or tanks 60 may be low-profile and run under the reels 42 and rack 42a such that the tank or tanks 60 do not impinge into the aisle (A) or unduly crowd the reels 42.

Figure 6:
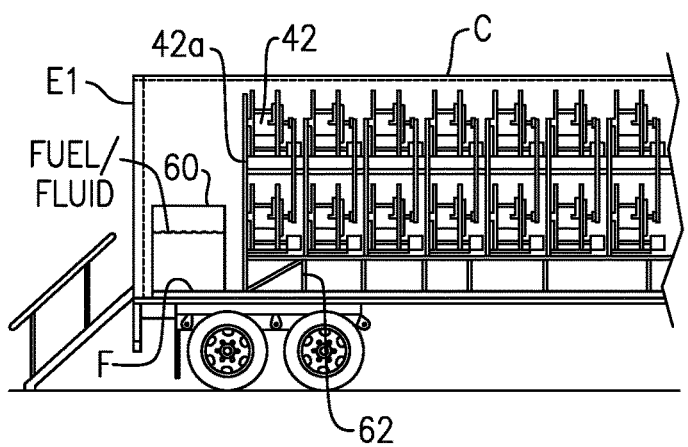
FIG. 6 illustrates a sectioned view of the station of FIG. 5.

As an example, the rack 42a may be raised off of the floor F such that the reels 42 are also raised. The tank or tanks 60 may completely or partially extend under the reels 42 and rack 42a, as is shown in FIG. 6. For instance, the rack 42a may be mounted or positioned on a spacer frame 62, which may be integrated with the rack 42a or provided as a separate piece. In any case, the region under the reels 42 and rack 42a is open such that the tank 60 can extend there through. The net effect is that the reels 42 and rack 42a are raised, which may reduce otherwise unused headspace above the reels 42 and rack 42a, but thereby provide space under the reels 42 and rack 42a that is utilized to accommodate the tank 60. If a rack 42a is not used to support the reels 42, and there is instead some other type of support system for the reels 42, the tank 60 extend under the just reels 42.

Figure 7:
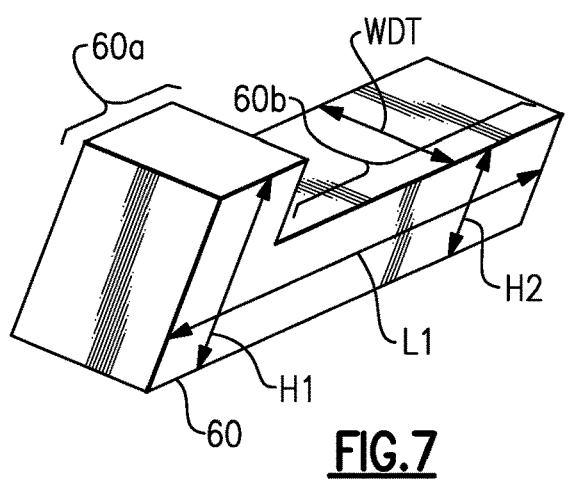
FIG. 7 illustrates an isolated view of an example fluid storage tank.

FIG. 7 shows an isolated view of a representative one of the tanks 60. The tanks 60 in this example are L-shaped and may be formed of stainless steel, although the tanks 60 may alternatively be formed of polymer or other metal depending on the fluid being stored. As shown in FIG. 7, the tank 60 is generally polygonal and the L-shape of the tank 60 includes a first leg 60a (rectangular) and a second leg 60b (rectangular) that define an overall tank length (L1). Here, the legs 60a/60b are of equivalent width (WDT), but the first leg 60a has a greater height (H1) than the height (H2) of the second leg 60b.

Figure 5:
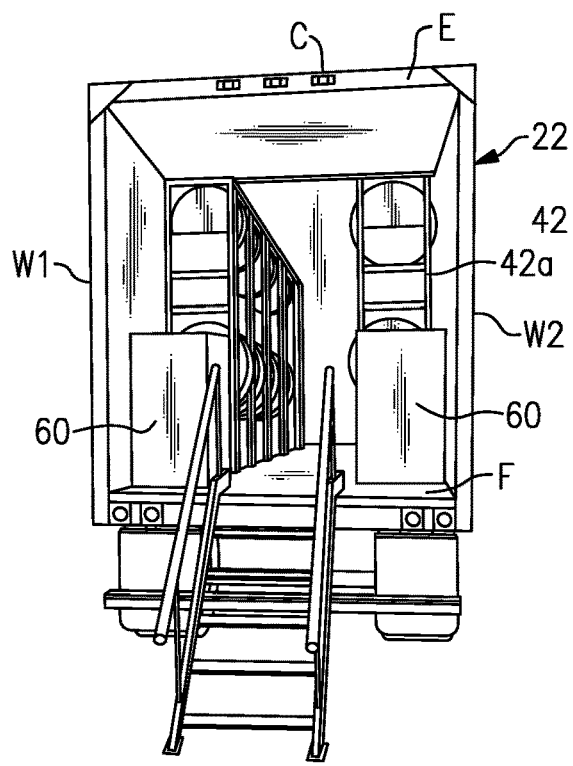
FIG. 5 illustrates an example of the mobile distribution station with an onboard fuel or fluid storage tank.

The L-shape permits the tank 60 to have a high volume. For instance, in the spatial layout of the equipment in the mobile trailer 22 there may be space in the length direction. In that regard, the first leg 60*a* may not be under the reels 42 and rack 42*a*, as shown in FIGS. 5 and 6 and only the second leg 60*b* extends under the reels 42 and rack 42*a*. This permits the first leg 60*a* to be greater in height, thus increasing the volume of the tank 60. As an example, the volume of the tank 60, including both legs 60*a*/60*b*, may be approximately 500 gallons.

At least the second leg 60*b* of the tank 60 is low-profile. For instance, the second leg 60*b* of the tank has an aspect ratio of width (WDT) to height (H2) that is greater than 1. In a further example, the aspect ratio is greater than 1.5. Such aspect ratios facilitate maximizing tank volume without crowding other equipment or creating undue hazard concerns. For example, if the width (WDT) were too large, the tank 60 would impinge into the aisle (A) and could potentially cause a tripping hazard. And if the height (H2) of the tank 60 is too large, there may be insufficient space for the reels 42, rack 42*a*, and manifold 38 there above.

Figure 8:
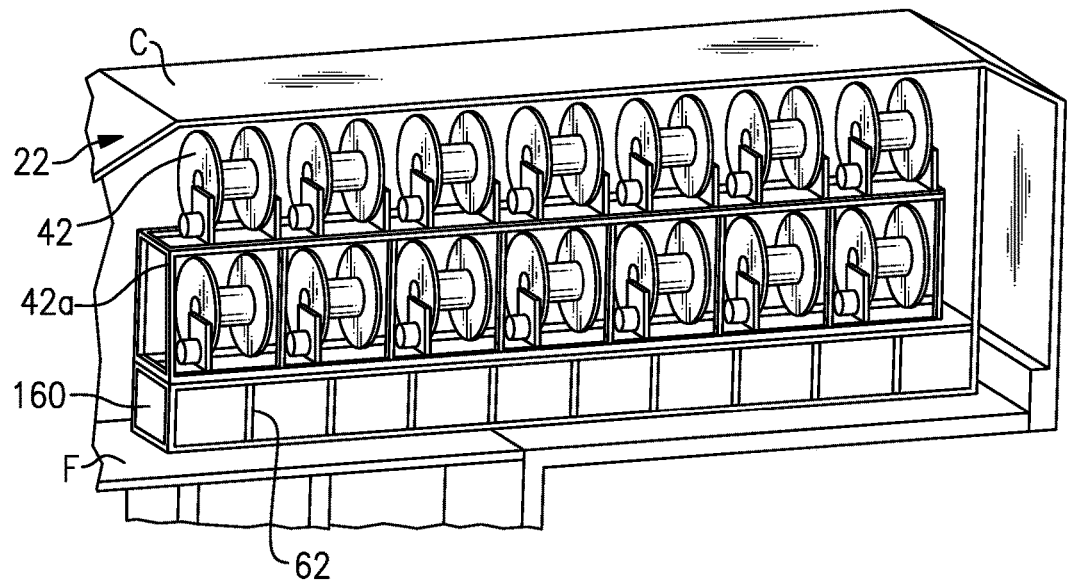
FIG. 8 illustrates a sectioned view of another example of the mobile distribution station with an onboard fuel or fluid storage tank.

Alternatively, as shown in a partial view of a modified example of the mobile trailer 22 in FIG. 8, the tank 160 may be linear instead of L-shaped. In this disclosure, like reference numerals designate like elements where appropriate and reference numerals with the addition of one-hundred or multiples thereof designate modified elements that are understood to incorporate the same features and benefits of the corresponding elements. In this example, the tank 160 is of uniform cross-section (e.g., rectangular) along its length and the entire or substantially entire tank 160 is under the reels 42 and rack 42*a*. The tank 160 may have the example aspect ratios discussed above.

Figure 9:
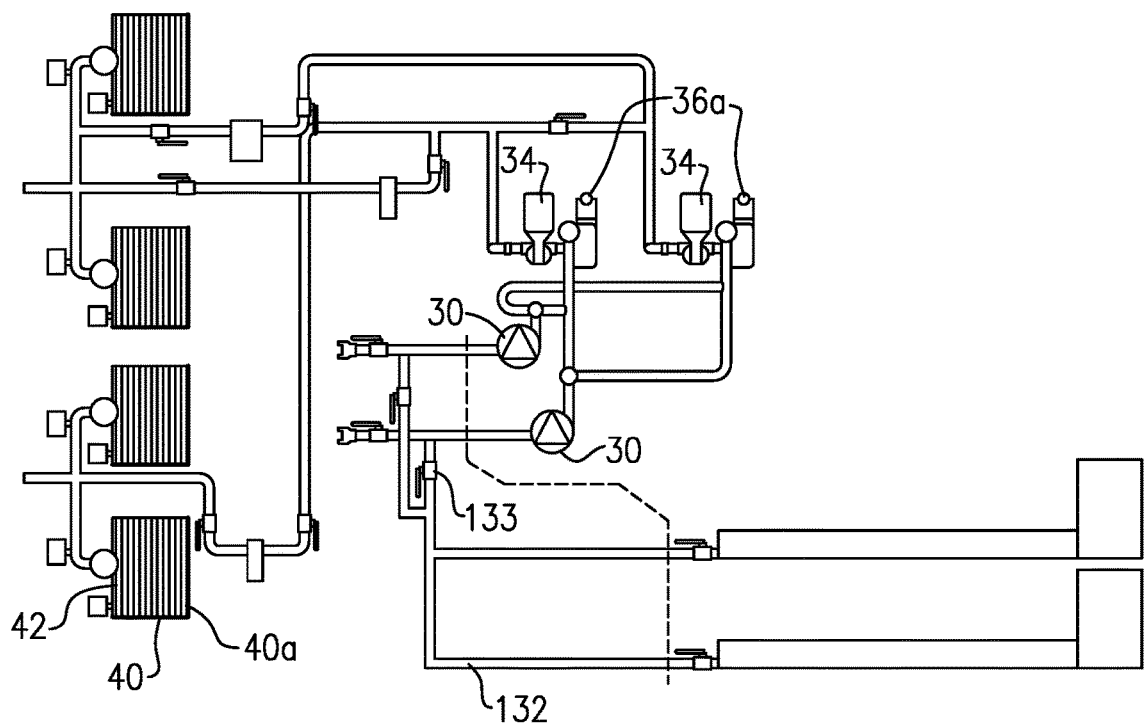
FIG. 9 illustrates a piping diagram showing how a fluid storage tank of a mobile distribution station is fluidly connected with a pump.

FIG. 9 illustrates a piping diagram that shows an example of how the tanks 60 (or alternatively tanks 160) may be fluidly connected with the pumps 30, reels 42, and hoses 40. As will be appreciated, the diagram shows a functional layout but does not necessarily represent the physical layout in the trailer 22. In general, a network of lines 132 (e.g., hard piping) and valves 133 interconnects the tanks 60 with the pumps 30, registers 34, air eliminators 36*a*, reels 42, and hoses 40. The valves 133 may be manual ball valves that can be selectively opened and closed to fluidly connect or disconnect the tanks 60 from the pumps 30, registers 34, air eliminators 36*a*, reels 42, and hoses 40*a*.

For instance, fewer than all of the reels 42 and hoses 40 are connected with the tanks 60 and, in one example, only a single reel 42 and hose 40 is connected with the tanks 60. That is, a single reel 42 and hose 42 may be designated for delivering the fuel or fluid from the tanks 60. In that regard, the designated hose 42 may be outfitted with a manual pump handle such that an operator can use the manual pump handle to refuel a piece of equipment, such as a truck or generator. Because the fuel or fluid from the tanks 60 is routed through the register 34, which is in communication with the controller 52, the controller 52 can track consumption of the fuel or fluid of the tanks 60 in a similar manner as discussed above. Alternatively, if there is space, the trailer 22 may include a pump 30 and register 34 that is dedicated for use with the tanks 60.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A distribution station comprising:
a mobile trailer;
a pump on the mobile trailer;
at least one manifold on the mobile trailer and fluidly connected with the pump;
a plurality of reels on the mobile trailer;
at least one fluid storage tank extending under the reels;
a plurality of hoses, each said hose connected with a different one of the reels;
a plurality of valves on the mobile trailer, each said valve situated between the at least one manifold and a respective different one of the reels;
a plurality of fluid level sensors, each said fluid level sensor being associated with a different one of the hoses; and
a controller configured to individually open and close the valves responsive to the fluid level sensors.

2. The distribution station as recited in claim 1, wherein the at least one fluid storage tank is L-shaped.

3. The distribution station as recited in claim 1, wherein the at least one fluid storage tank has an aspect ratio of width to height that is greater than 1.

4. The distribution station as recited in claim 1, wherein the at least one fluid storage tank has an aspect ratio of width to height that is greater than 1.5.

5. The distribution station as recited in claim 1, wherein the at least one fluid storage tank is connected with the pump and at least one of the reels and one of the hoses.

6. The distribution station as recited in claim 1, wherein the at least one fluid storage tank includes first and second fluid storage tanks that are arranged on, respectively, first and second opposed sides of the mobile trailer, with an aisle walkway down the middle of the mobile trailer between the first and second fluid storage tanks.

7. The distribution station as recited in claim 1, further comprising diesel fuel contained in the at least one fluid storage tank.

8. The distribution station as recited in claim 1, wherein:
the mobile trailer includes a compartment having a floor and a ceiling,
the reels are in the compartment and are raised above the floor by a space, and
the at least one fluid storage tank is arranged in the space.

9. The distribution station as recited in claim 1, wherein the mobile trailer includes a compartment enclosing the at least one fluid storage tank and the reels.

10. The distribution station as recited in claim 1, wherein each of the fluid level sensors are configured to be mounted on a different, respective fuel tank.

11. The distribution station as recited in claim 10, wherein the pump is configured to cause a pressurized flow of fluid to flow out a respective one of the hoses and into a respective one of the fuel tanks.

12. A distribution station comprising:
a mobile trailer;
a pump on the mobile trailer;
at least one manifold on the mobile trailer and fluidly connected with the pump;

a plurality of reels on the mobile trailer;

a rack supporting the reels;

at least one fluid storage tank extending under the rack;

a plurality of hoses, each said hose connected with a different one of the reels;

a plurality of valves on the mobile trailer, each said valve situated between the at least one manifold and a respective different one of the reels;

a plurality of fluid level sensors, each said fluid level sensor being associated with a different one of the hoses; and a controller configured to individually open and close the valves responsive to the fluid level sensors.

13. The distribution station as recited in claim 12, wherein the at least one fluid storage tank is L-shaped.

14. The distribution station as recited in claim 12, wherein the at least one fluid storage tank has an aspect ratio of width to height that is greater than 1.

15. The distribution station as recited in claim 12, wherein the at least one fluid storage tank includes first and second fluid storage tanks that are arranged on, respectively, first and second opposed sides of the mobile trailer, with an aisle walkway down the middle of the mobile trailer between the first and second fluid storage tanks.

16. The distribution station as recited in claim 15, wherein the at least one fluid storage tank has an aspect ratio of width to height that is greater than 1.5.

17. The distribution station as recited in claim 16, wherein the at least one fluid storage tank is connected with the pump and at least one of the reels and one of the hoses.

18. The distribution station as recited in claim 12, further comprising diesel fuel contained in the at least one fluid storage tank.

19. A distribution station comprising:

a mobile trailer;

a pump on the mobile trailer;

at least one manifold on the mobile trailer and fluidly connected with the pump;

a plurality of reels on the mobile trailer;

a low-profile fluid storage tank on the mobile trailer and fluidly connected with the pump;

a plurality of hoses, each said hose connected with a different one of the reels;

a plurality of valves on the mobile trailer, each said valve situated between the at least one manifold and a respective different one of the reels;

a plurality of fluid level sensors, each said fluid level sensor being associated with a different one of the hoses; and a controller configured to individually open and close the valves responsive to the fluid level sensors.

20. The distribution station as recited in claim 19, wherein the low-profile fluid storage tank has an aspect ratio of width to height that is greater than 1.5.

21. The distribution station as recited in claim 20, wherein:

the mobile trailer includes a compartment having a height between a floor and a ceiling, and a width between opposed side walls, and the low profile storage tank is arranged such that the width of the low profile storage tank extends in a direction parallel to the width of the compartment, and the height of the low profile storage tank extends in a direction parallel to a height of the compartment.

22. The distribution station as recited in claim 21, wherein:

the compartment has a length and an aisle along the length, at least some reels are arranged on a first side of the aisle and at least some other reels are arranged on a second side of the aisle opposite the first side, the low-profile storage tank is a first low-profile storage tank and is arranged under the reels on the first side of the aisle, and a second low-profile storage tank is arranged under the reels on the second side of the aisle.

* * * * *